United States Patent
Matsuki et al.

(10) Patent No.: US 7,170,553 B2
(45) Date of Patent: Jan. 30, 2007

(54) IMAGE PROCESSING APPARATUS, IMAGE PROCESSING METHOD AND PORTABLE IMAGING APPARATUS

(75) Inventors: Hiroyuki Matsuki, Tenri (JP); Kensuke Takai, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 758 days.

(21) Appl. No.: 10/132,267

(22) Filed: Apr. 26, 2002

(65) Prior Publication Data

US 2002/0159656 A1    Oct. 31, 2002

(30) Foreign Application Priority Data

Apr. 26, 2001    (JP) .............................. 2001-130451

(51) Int. Cl.
    *H04N 5/228*    (2006.01)
(52) U.S. Cl. .............................. 348/222.1; 348/231.99
(58) Field of Classification Search ............ 348/222.1, 348/231.99, 231.9, 294; 382/305, 299, 232, 382/293, 297; 710/22; 712/25, 1
    See application file for complete search history.

(56) References Cited

U.S. PATENT DOCUMENTS

| | | | | |
|---|---|---|---|---|
| 6,629,161 B2 * | 9/2003 | Matsuki et al. ............... | 710/22 |
| 6,757,019 B1 * | 6/2004 | Hsieh et al. ................. | 348/294 |
| 6,757,447 B2 * | 6/2004 | Yamaguchi et al. ......... | 382/293 |
| 6,798,927 B2 * | 9/2004 | Kosugi et al. .............. | 382/299 |
| 2002/0054212 A1 * | 5/2002 | Fukuoka ..................... | 348/207 |
| 2003/0048951 A1 * | 3/2003 | Rengakuji et al. .......... | 382/232 |
| 2003/0117513 A1 * | 6/2003 | Anderson ............. | 348/333.11 |
| 2004/0095482 A1 * | 5/2004 | Sasaki ................... | 348/231.99 |
| 2004/0105016 A1 * | 6/2004 | Sasaki ..................... | 348/222.1 |

FOREIGN PATENT DOCUMENTS

| JP | 63-98056 A | | 4/1988 |
|---|---|---|---|
| JP | 04-237263 | | 8/1992 |
| JP | 09182072 A | * | 7/1997 |
| JP | 09-319788 | | 12/1997 |

* cited by examiner

*Primary Examiner*—Aung Moe
(74) *Attorney, Agent, or Firm*—Birch, Stewart, Kolasch & Birch, LLP

(57) ABSTRACT

An apparatus for processing an image includes a memory for storing the image data of each pixel in the plurality of unit blocks, a direct memory access controller for reading the image data from the memory by accessing the memory on a block-by-block basis by generating the addresses of the pixels in each unit block, and a plurality of image processing modules for receiving the image data of each unit block read based on the addresses generated by the direct memory access controller and sequentially transferred via a data bus, processing the image data of the unit block, and outputting the processed image data of the unit block.

7 Claims, 12 Drawing Sheets

IMAGE PROCESSING APPARATUS, IMAGE PROCESSING METHOD AND PORTABLE IMAGING APPARATUS

BACKGROUND OF THE INVENTION

1. Field of the Invention

The present invention relates to an image processing apparatus and an image processing method, and a portable imaging apparatus using the same, such as a digital still camera, etc. More particularly, the present invention relates to an image processing apparatus and an image processing method in which image data is processed by repetition of data transfer between an image processing module which subjects local image data to a predetermined image processing, and a large-scale memory capable of storing data an entire image data, by means of direct memory access (hereinafter referred to as DMA) but not via a CPU, and to a portable imaging apparatus including the same.

2. Description of the Related Art

An exemplary digital still camera works in the following manner. Image data is captured by a charge coupled device (CCD) through a color filter. The captured image data is split and converted from RGB data on a Bayer array to YcbCr luminance data and color difference data which are then subjected to a JPEG compression process. The resultant image data is stored in a memory card or the like. Alternatively, the YcbCr luminance data and color difference data are subjected to data decompression processing or conversion to video signals, and the resultant data is displayed for monitoring an image before taking a picture. The data stored in the memory card is read out and displayed.

Such an apparatus for processing image data may comprises a CPU 101, a DMA controller 102, n image processing modules 103, a memory controller 104, an external memory 105, etc. as shown in FIG. 10, in which data is transferred via a data bus 106. In this apparatus, for example, digital data is obtained from a CCD, then the digital data is split and converted to luminance data and color difference data, those data are subjected to a JPEG compression process and a conversion process to video signals, and the like by the corresponding image processing modules 103. Only one image processing module 103 may be present in the apparatus.

In such image processing, a vast amount of data needs to be processed. In actual image data, data of a pixel is closely correlated to data of pixels around that pixel. The same processing is often repeatedly applied to data corresponding to a cluster of closely correlated pixels in a local region. Therefore, in order to efficiently process data of such a cluster of pixels in a local region, each image processing module 103 works as follows. Data is read from the external memory 105 in accordance with addresses regularly generated by the DMA controller 102 and then transferred to the image processing modules 103. Alternatively, data processed by the image processing modules 103 is similarly transferred to the external memory 105 by the DMA controller 102 and is stored in the external memory 105.

Data transfer between each image processing module 103 is conducted via the external memory 105. In this case, the DMA controller 102 appropriately manages transfer requests from each of the image processing modules 103 in accordance with priorities or the like thereof. One of the image processing module 103 which received an acknowledge signal from the DMA controller 102 uses the data bus 106 or the external memory 105. In this manner, the external memory 105 and the data bus 106 are shared by the image processing modules 103, thereby simplifying the whole structure of the image processing apparatus.

In such an image processing apparatus, when only a portion (shaded portion) of an entire image data stored in the external memory 105 is processed as shown in FIG. 11, the image data of horizontally-arranged pixels on continuous lines on a screen are not stored at continuous addresses in the external memory 105 as shown in FIG. 12 (shaded portion). FIG. 11 schematically shows the relationship between the positions of pixels on a screen and the address space of the external memory 105 storing data corresponding to the pixels. In FIG. 11, (PIXEL+1) pieces of data which are stored in a lateral (horizontal) line is processed. The (PIXEL+1) pieces of data are a part of data stored in one line in the external memory 105. In FIG. 12, pixel data corresponding to each horizontal line on the screen is stored in a portion (PIXEL+1) in the address space of the external memory 105 which corresponds to one line in the address space (corresponding to an address increment of INCPX).

In this case, pixel data is read from a two-dimensional array in the address space of the external memory 105 and is then transferred. Such processing is disclosed, for example, in Japanese Laid-Open Publication No. 63-98056.

The processing method described in the above-described publication will be described below with reference to FIG. 11. In FIG. 11, INCPX represents an address increment between two adjacent lines in the address space of the external memory 105; PIXEL+1 represents the width of a region of image data to be currently transferred; BASE represents the start address of the region from which data transfer begins; and END represents the end address of the region at which the data transfer ends. In one-time actuation of the DMA controller 102, such a rectangular region of image data required for image processing is read out and transferred to the image processing module 103.

In this case, the DMA controller 102 begins reading from the leftmost address BASE+0, and reads image data from the external memory 105 while successively pointing the addresses in a horizontal direction toward the right pixel by pixel (+1). The read-out data is transferred to the image processing module 103. After the address is BASE+PIXEL (the line width is PIXEL+1), the DMA controller 102 then points to a leftmost pixel positioned a line below, where the address of the pixel is BASE+INCPX. Similarly, the DMA controller 102 reads image data from the external memory 105 while successively pointing the addresses in the horizontal direction toward the right pixel by pixel (+1). The read-out data is transferred to the image processing module 103. In this manner, the address pointing, data reading and data transfer are continued until the address is eventually END. This process is one-time DMA actuation.

In addition, the start address, and the width and length of a region on a screen to be processed may be changed.

For the purposes of filtering for noise reduction, image enlargement using first-order interpolation, image reduction, etc., and compression and decompression, etc., data values are taken from a pixel to be processed and its surrounding pixels. The data values are multiplied by coefficients and are subjected to addition, subtraction, etc. In other words, a screen is divided into blocks. Data is read from a memory on a block-by-block basis, and is transferred to an image processing module. The image processing module processes data on a block-by-block basis, and the processed data is then transferred on a block-by-block basis to be stored in a memory.

In this case, the image processing module sometimes has to simultaneously access the image data of a plurality of pixels in a block. To this end, the image processing module needs to include a buffer (buffer memory) for temporarily storing the image data. The capacity of such a buffer influences the size of an LSI chip. Therefore, the buffer is preferably as small as possible.

When such block-by-block transfer is performed in one-time actuation of DMA transfer in accordance with the conventional technique described in the above-described Japanese Laid-Open Publication No. 63-98056, an address space region to be subjected to image processing is horizontally scanned from a leftmost pixel (e.g., corresponding to BASE+0) to a rightmost pixel (e.g., corresponding to BASE+PIXEL) so that all pixel data in a horizontal line is read out and transferred.

Therefore, the image processing module needs to include a buffer having at least a capacity of the vertical size of a block×the transfer line width (as indicated by the blank portion in FIG. 13) so as to store data from a region of the address space of the memory (to be processed) in which data to be transferred is stored as shown in FIG. 13. After stored into the buffer, the data is processed on a block-by-block basis.

For this reason, the buffer capacity has to be large. However, if the buffer capacity is limited, the maximum line width of an image region which can be processed is limited. The capacity of a buffer is actually designed to be two times or the like the size of a unit block by taking data holding into consideration. For the sake of simplicity, this is not explained.

Alternatively, if the size of data to be transferred is the vertical size of a block×the width of a block, the buffer capacity can be small. In this case, however, the DMA controller needs to be activated for every block transfer, adversely elongating a processing time required for processing an entire image.

SUMMARY OF THE INVENTION

According to one aspect of the present invention, an apparatus for processing an image is provided, in which the image includes a plurality of unit blocks each containing M×N pixels where M pixels are arranged in a horizontal direction and N pixels are arranged in a vertical direction. The apparatus comprises a memory for storing the image data of each pixel in the plurality of unit blocks, a direct memory access controller for reading the image data from the memory by accessing the memory on a block-by-block basis by generating the addresses of the pixels in each unit block, and a plurality of image processing modules for receiving the image data of each unit block read based on the addresses generated by the direct memory access controller and sequentially transferred via a data bus, processing the image data of the unit block, and outputting the processed image data of the unit block. The direct memory access controller sequentially generates the addresses of the pixels in one horizontal line in each unit block and thereafter generates the addresses of the pixels on another horizontal line immediately below said one horizontal line in the unit block, and repeats this operation to read the image data of the unit block. The direct memory access controller sequentially reads the image data of the unit blocks in one horizontal line in the image and thereafter sequentially reads the image data of the unit blocks on another horizontal line immediately below said one horizontal line in the image, and repeats this operation to read the data of the image.

In one embodiment of this invention, the direct memory access controller comprises a plurality of registers for storing the number of pixels in one horizontal line in one unit block, the number of pixels in one vertical line in one unit block, the number of blocks in one horizontal line in the image, an address increment representing an address space of the memory between the address of one pixel and the address of another pixel immediately below said one pixel, a data transfer initiation address, and a data transfer completion address, respectively, a plurality of counters for determining the horizontal and vertical coordinates of the pixels in each unit block, the ordinal number in the horizontal direction of the unit block, and the ordinal number in the vertical direction of the unit block, respectively, wherein the pixels correspond to the input/output data of the memory, and an address calculating section for calculating each address based on the values stored in the plurality of registers and values counted by the plurality of counters.

In one embodiment of this invention, the image processing module comprises at least an input buffer, an output buffer, a direct memory access request outputting section for outputting a direct memory access request for data input to the direct memory access controller when the data of one unit block stored in the input buffer remains small, and outputting a direct memory access request for data output to the direct memory access controller when a predetermined amount of the data of one unit block is stored in the output buffer.

In one embodiment of this invention, the direct memory access controller further comprises a register for storing the number of pixels on a vertical line from the uppermost line of one unit block to the uppermost line of another block immediately below said one block, wherein from the uppermost line of said another block, data transfer is initiated again after the image data of all of the unit blocks in one horizontal line in the image has been transferred.

In one embodiment of this invention, the number of pixels in one horizontal line in one unit block being input to or output from the image processing module and the number of pixels in one vertical line in said unit, both numbers being obtained from the plurality of image processing modules, are stored in the respective registers of the direct memory access controller.

According to another aspect of the present invention, a method for processing an image using an apparatus for processing an image in which the image includes a plurality of unit blocks each containing M×N pixels where M pixels are arranged in a horizontal direction and N pixels are arranged in a vertical direction. The apparatus comprises a memory for storing the image data of each pixel in the plurality of unit blocks, a direct memory access controller for reading the image data from the memory by accessing the memory on a block-by-block basis by generating the addresses of the pixels in each unit block, and a plurality of image processing modules for receiving the image data of each unit block read based on the addresses generated by the direct memory access controller and sequentially transferred via a data bus, processing the image data of the unit block, and outputting the processed image data of the unit block. The direct memory access controller sequentially generates the addresses of the pixels in one horizontal line in each unit block and thereafter generates the addresses of the pixels on another horizontal line immediately below said one horizontal line in the unit block, and repeats this operation to read the image data of the unit block. The direct memory access controller sequentially reads the image data of the unit blocks in one horizontal line in the image and thereafter sequentially reads the image data of the unit blocks on another horizontal line immediately below said one horizontal line in the image, and repeats this operation to read the data of the image.

According to another aspect of the present invention, a portable imaging apparatus comprises an image capturing section including a charge coupled device and an image processing apparatus according to the present invention, in which the image processing apparatus processes the data of an image captured by the charge coupled device.

Hereinafter, functions of the present invention will be described.

The image processing apparatus of the present invention comprises a memory, a direct memory access controller (DMA controller), and one or more image processing modules connected to a data bus, in which data is processed on a block-by-block basis. Each unit block contains M pixels (horizontal line)×N pixels (vertical line), and the block-by-block data transfer is conducted between the memory and the image processing modules in accordance with addresses generated by the DMA controller. In the image processing apparatus, the DMA controller comprises registers for storing the horizontal size of a block (the number of pixels in a horizontal line), the vertical size of a block (the number of pixels on a vertical line), the number of blocks in a horizontal line in an image, an address increment representing a memory space between the address of a pixel and the address of another pixel immediately below that pixel, a data transfer initiation address value (start address), and a data transfer completion address value (end address), respectively. The DNA controller further comprises counters for counting the horizontal and vertical coordinates of a pixel in a block corresponding to data to be input to or output from the memory, the ordinal number of the block in the horizontal direction and the ordinal number of the block in the vertical direction; and an address calculating section for calculating an address based on the values stored in the registers and the values counted by the counters.

First, the DMA controller transfers data commencing from the start address of a block stored in one of the registers and proceeding to the right of the block as described below in Example 1 and with reference to FIG. 4. The number of pixels in a horizontal line stored in the register which is the horizontal size of a block is compared with the horizontal coordinate counted by one of the counters so as to determine whether or not the data of the predetermined number of pixels in a horizontal line have been transferred. If the data of pixels corresponding to the horizontal line have been transferred, then the data of the pixels in the next line (immediately below the previous line in FIG. 4) are transferred.

Thereafter, the number of pixels on a vertical line stored in one of the registers, which is the vertical size of a block, is compared with the vertical coordinate counted by one of the counters so as to determine whether or not the data of a predetermined number of pixels on a vertical line have been transferred. If the data of pixels corresponding to the vertical line have been transferred, then data of the pixels on the next block (to the immediate right of the previous block in FIG. 4) are transferred.

Thereafter, the number of blocks in a horizontal line in an image stored in one of the registers is compared with the ordinal number of a block in the horizontal direction counted by one of the counters so as to determine whether or not the data of the predetermined rightmost block has been transferred. If the data of the predetermined rightmost block has been transferred, then the data of the blocks in a horizontal line in the image immediately below the previous horizontal line are similarly transferred on a block-by-block basis in order of from the leftmost block to the rightmost block.

Finally, the address calculating section calculates the address of a pixel in a block corresponding to data to be input to or output from the memory based on the horizontal and vertical coordinates of the pixel, which are counted by one of the counters; the ordinal number of the block in the horizontal direction; the ordinal number of the block in the vertical direction; an address increment representing a memory space between the address of a pixel and the address of another pixel immediately below that pixel, which is stored in one of the registers; and the start address. If the resultant address matches the end address stored in one of the registers, DMA transfer is ended.

Thus, the DMA controller provides a function of controlling addresses, thereby making it possible to transfer the data of a region in an image on a block-by-block basis between the memory and the image processing modules by one-time DMA actuation.

The image processing modules can share a data bus as described below in Example 2.

Further, as described below in Example 3, in a case where the data of a peripheral portion of a block needs to be repeatedly transferred, for example, the vertical coordinate (in an image) of a pixel in a block may be determined by a counter instead of the ordinal number of a block in the vertical direction.

Furthermore, as described below in Example 4, when the change of the size of a block is required, for example, the horizontal and vertical sizes of a block to be input to or output from an image processing module may be stored in a register from the image processing module.

The thus-constructed image processing apparatus of the present invention minimizes the capacity of buffers, resulting in miniaturization of the apparatus. Therefore, the present invention is suitably applied to digital data capturing, separation and conversion between luminance data and color difference data, JPEG compression processing, conversion to video signals, filtering, etc., which are performed in a portable imaging apparatus using a charge coupled device, etc.

Thus, the invention described herein makes possible the advantages of providing an image processing apparatus and an image processing method in which a region of an image to be processed can be transferred on a block-by-block basis in one-time DMA actuation, and the capacity of buffers in an image processing module can be reduced to be as small as about the size of a unit block, and a portable imaging apparatus.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
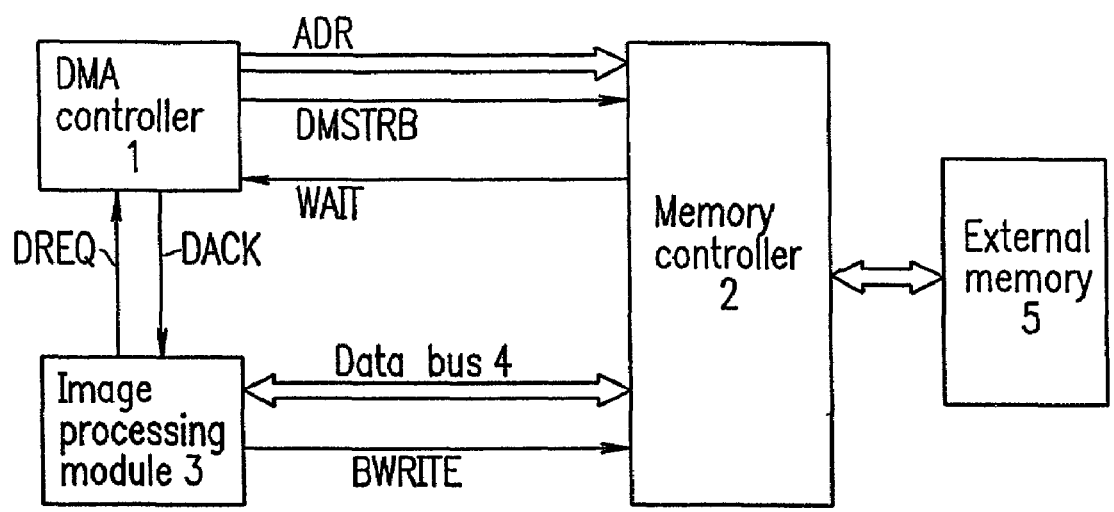
FIG. 1 is a block diagram showing a configuration of an image processing apparatus according to Example 1 of the present invention.

FIG. 1. is a block diagram showing a configuration of an image processing apparatus according to Example 1 of the present invention. This image processing apparatus comprises a DMA controller 1, a memory controller 2, an image processing module 3 and an external memory 5, among which image data is transferred via a data bus 4. For the sake of simplification, the control of the DMA controller 1 is described without reference to a CPU (not shown). Further, it is assumed that there is only one image processing module 3. In FIG. 1, a configuration for subjecting image data from a charge coupled device (CCD) to analog-to-digital conversion and inputting the resultant data into the image processing module 3, and after conversion of the resultant data into a video signal, a configuration for outputting the video signal to a display, are omitted.

In the image processing apparatus, the image processing module 3 comprises an input buffer and an output buffer so that image data is input or output and processed on a block-by-block basis. The image processing module 3 outputs a DMA request signal DREQ for data input or output to the DMA controller 1 depending on the progress of internal processing or the amount of data held in the buffer.

The DMA controller 1 generates a read address signal ADR indicating a real address in the external memory 5 based on setting values held in internal registers and a count value in a counter, and outputs the signal to the memory controller 2. The registers and the counter will be described in detail below.

When image data is input from the memory 5 to the image processing module 3, the memory controller 2 receives a strobe signal DMSTRB from the DMA controller 1 and reads a block of data from the external memory 5 in accordance with the address signal ADR, and outputs the readout data to the data bus 4. Further, the memory controller 2 outputs a signal WAIT to the DMA controller 1 to indicate the valid term of data on the data bus 4.

The image processing module 3 receives a DMA acknowledge signal DACK from the DMA controller 1 with respect to a DMA request, and takes a block of image data on the data bus 4 at an appropriate time into an internal buffer. Meanwhile, the DMA controller 1 accesses the external memory 5 in sequence while an internal counter counts, when data on the data bus 4 is valid.

Conversely, a DMA request signal DREQ is output to the DMA controller 1 in order to draw the resultant data of the block-by-block image processing from the image processing module 3.

In this case, the memory controller 2 informs of the DMA controller 1 that there is no access or that data may be output to the data bus 4 responsive to the signal WAIT when an accessing process is completed. In response to this, the DMA controller 1 outputs the DMA acknowledge signal DACK to the image processing module 3. The image processing module 3 receives the DMA acknowledge signal DACK, and outputs a block of data from the internal output buffer to the data bus 4.

The memory controller 2 receives the real address signal ADR and the strobe signal DMSTRB in the memory 5 from the DMA controller 1, and stores data on the data bus 4 into the external memory 5 in accordance with the real address signal ADR.

The memory controller 2 performs a readout operation with respect to the external memory 5 when a signal BWRITE is Low, and outputs the readout data value to the data bus 4. Thereafter, when data on the data bus 4 becomes valid, the signal WAIT is removed. Further, the memory controller 2 writes data on the data bus 4 to the external memory 5 when the signal BWRITE output from the image processing module 3 is High.

Figure 4:
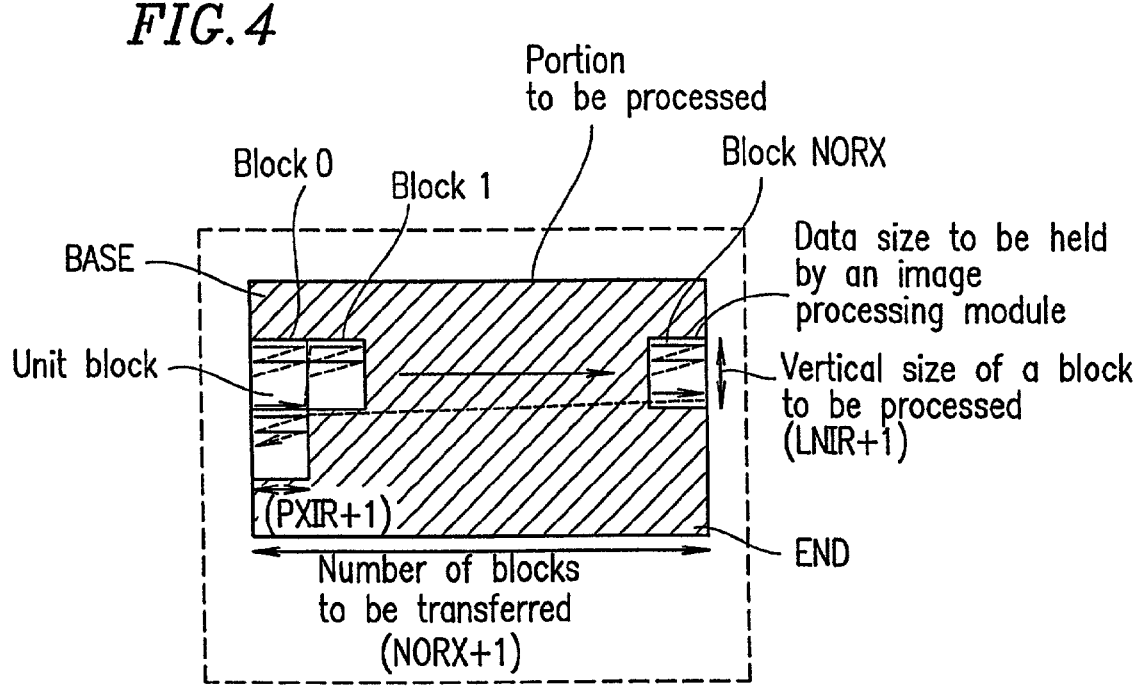
FIG. 4 is a diagram for explaining the order of data transfer in the image processing apparatus of Example 1.

For such an image processing apparatus, as shown in FIG. 4, a region of image data to be processed is divided into a plurality of blocks in which a plurality of pixels are arranged in horizontal and vertical directions, and the image data is transferred on a block-by-block basis to the image processing module 3 which performs image processing. In the data processing region, data transfer is conducted on a block-by-block basis from an uppermost and leftmost block to the right direction. When the data transfer processing of all of the blocks in the horizontal direction has been completed, all blocks immediately below the previous blocks in the horizontal direction are similarly subjected to data transfer processing from the leftmost block on a block-by-block basis to the right.

In each block, data transfer processing is conducted from an uppermost and leftmost pixel on a pixel-by-pixel basis toward the right. When data transfer processing has been completed for all pixels in a horizontal line direction, all pixels immediately below the previous pixels are subjected to data transfer processing from a leftmost pixel on a pixel-by-pixel basis to the right.

Figure 2:
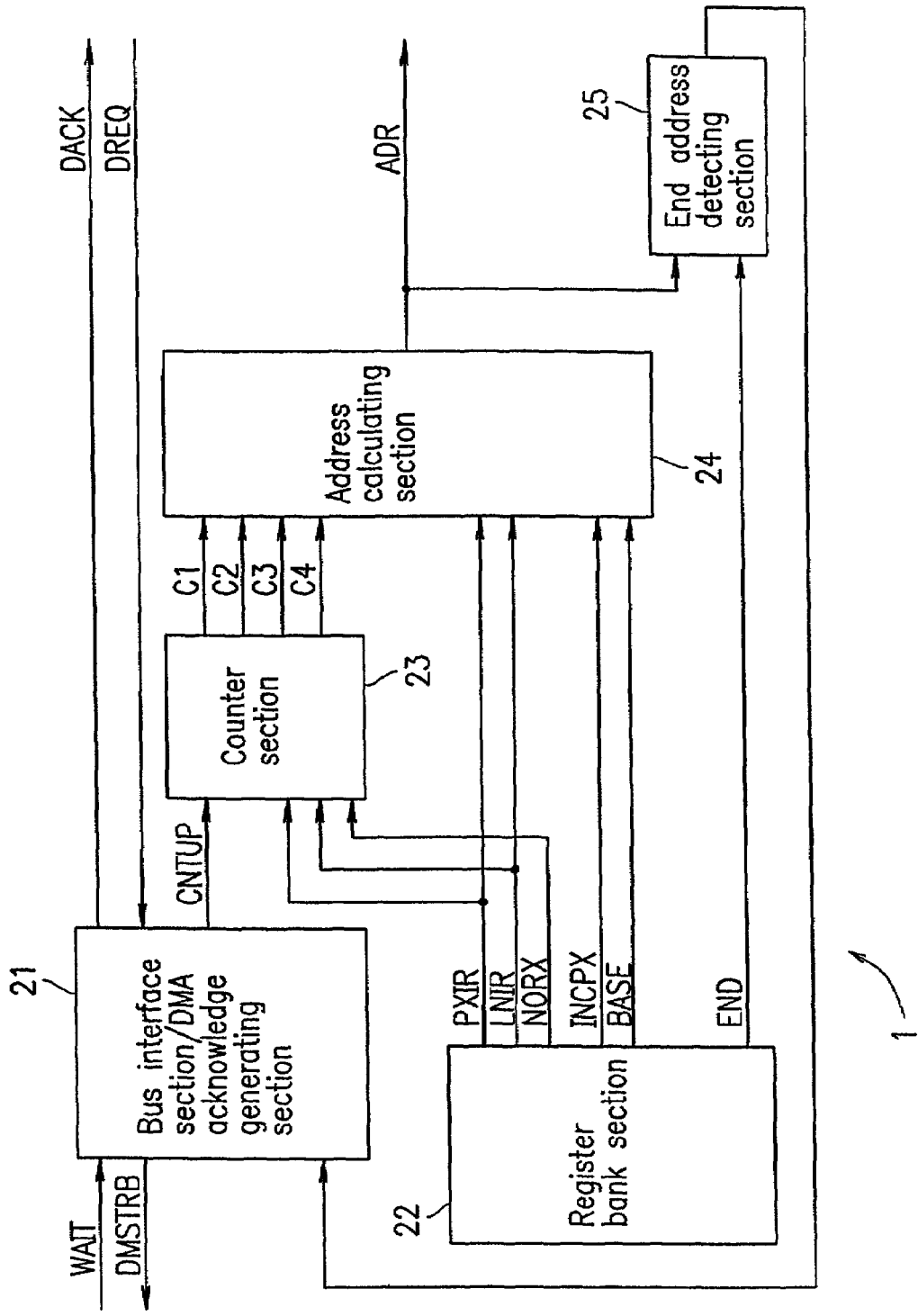
FIG. 2 is a block diagram for explaining a circuit configuration of a DMA controller in the image processing apparatus of Example 1.

FIG. 2 is a block diagram for explaining the circuit configuration of the DMA controller 1 in the above-described image processing apparatus. This DMA controller 1 comprises a section 21 including a bus interface section and a DMA acknowledge generating section, a register bank section 22, a counter section 23, an address calculating section 24, and an end address detecting section 25.

The section 21 generates and outputs a strobe signal DMSTRB to the external memory 5, based on the DMA request signal DREQ from the image processing module 3.

The strobe signal DMSTRB is used for the memory controller 2 to take an address signal ADR.

Further, responsive to a signal WAIT output from the memory controller 2, the section 21 outputs a count-up signal CNTUP to the counter section 23 every time one pixel of data to be processed in a horizontal line in an image region is transferred, during a period of time (cycle) indicating the validity of data on the data bus 4. The counter section 23 is instructed by the count-up signal CNTUP to increment the count. At the same time, the section 21 also outputs a DMA acknowledge signal DACK to the image processing module 3.

When the memory controller 2 receives the strobe signal DMSTRB, the memory controller 2 takes the address signal ADR from the DMA controller 1 and accesses the external memory 5.

Further, responsive to the signal WAIT from the memory controller 2, the section 21 determines whether or not data on the data bus 4 is valid, when the external memory 5 is being accessed (the signal WAIT is active), i.e., when data is being read from the external memory 5. Further, if data is being written to the external memory 5, the free space of the data bus 4 is determined. Further, when the signal WAIT is not active, it is determined that the external memory 5 is not being accessed.

The register bank section 22 has first and second registers. The first register stores the number of pixels (PXIR) in the horizontal direction which indicates the horizontal size (width) of one block to be transferred. The second register stores the number of pixels (LNIR) in the vertical direction which indicates the vertical size (length) of one block. The register bank section 22 further has third, fourth, fifth and sixth registers. The third register stores the number of blocks (NORX) in a horizontal line in an image region. The fourth register stores the value (BASE) of an address from which data transfer is initiated (start address). The fifth register stores the value (END) of an address at which data transfer is ended (end address). The sixth register stores the increment value (INCPX) of address representing an address space of the external memory 5 (i.e., an address increment between the address of a pixel and the address of another pixel immediately below that pixel).

Although the number of pixels in the horizontal direction of one block, which is stored in the first register, is PXIR+1 ranging from 0 to PXIR, the value stored by the first register is PXIR since the number is counted from zero. Although the number of pixels in the vertical direction of one block, which is stored in the second register, is LNIR+1 ranging from 0 to LNIR, the value stored in the second register is LNIR since the number is counted from zero. The number of blocks in the horizontal direction stored in the third register is NORX+1 ranging from 0 to NORX, the value stored in the third register is NORX since the number is counted from zero. These setting values in the registers are determined by a host computer (not shown) which controls the image processing system.

The counter section 23 comprises first, second, third and fourth counters (their outputs are represented by C1 to C4, respectively). The first counter is used to determine the horizontal position (coordinate) of a pixel in a block, whose image data is being transferred. The second counter is used to determine the vertical position (coordinate) of the pixel in the block, whose image data is being transferred. The third counter is used to determine the ordinal number of the block in the horizontal direction, which is being processed (the data of its pixels is being transferred). The fourth counter is used to determine the ordinal number of the block in the vertical direction, which is being processed (the data of its pixels is being transferred).

Figure 3:
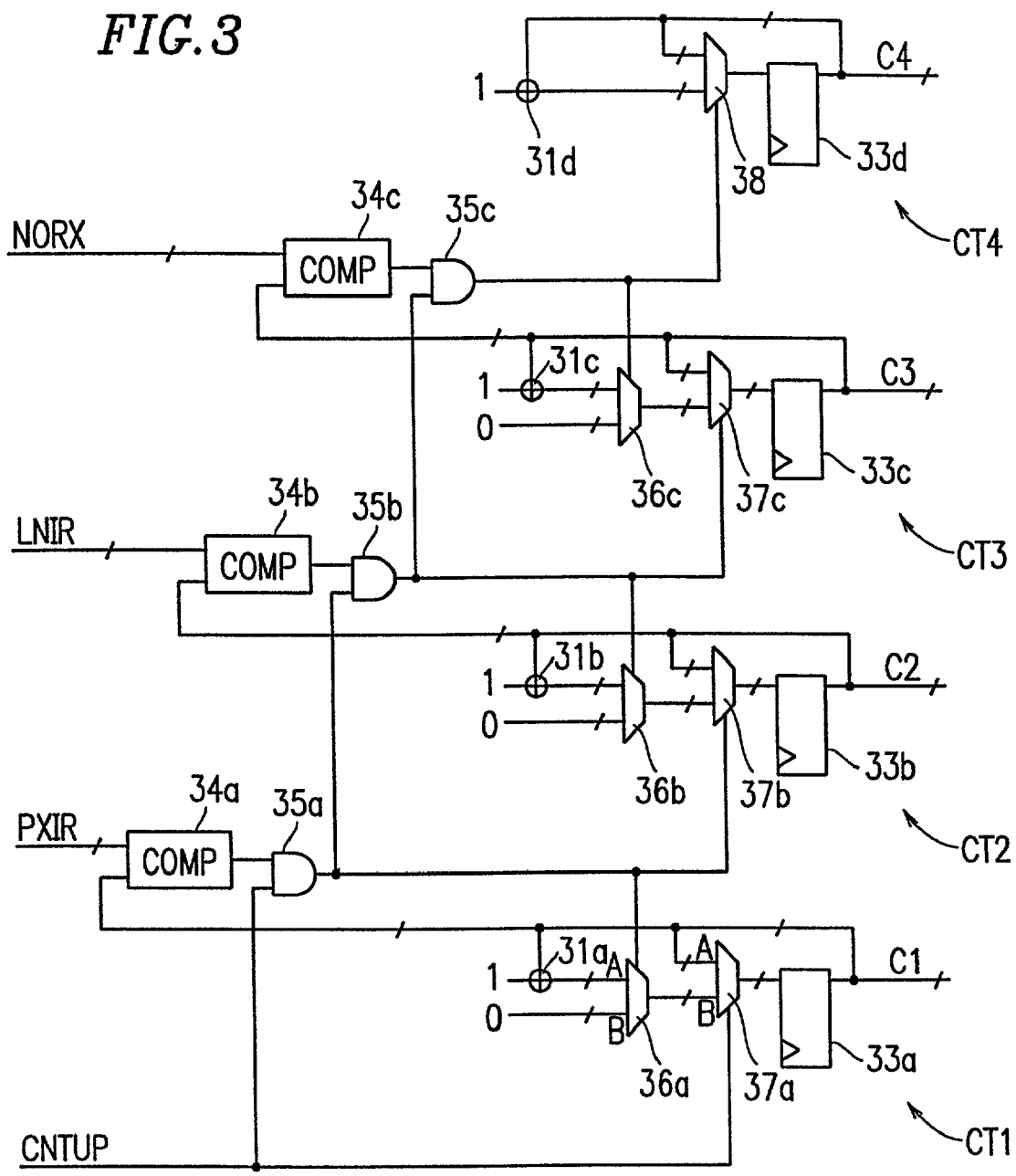
FIG. 3 is a circuit diagram for explaining a configuration of a counter section of the DMA controller in the image processing apparatus of Example 1.

FIG. 3 is a circuit diagram for explaining the detailed configuration of the counter section 23. The counter section 23 comprises first to fourth counters CT1 to CT4 which are combinations of four adders 31a to 31d, three first selectors 36a to 36c and three second selectors 37a to 37a, a selector 38, four latch circuits 33a to 33d, three comparators (COMP) 34a to 34c, and three AND gates 35a to 35c. Although in FIG. 3, each signal is represented by a single line, the signal is sent over a plurality of pit lines. For example, each latch circuit or the like comprises a plurality of latch circuits corresponding to the bit lines. Also, in FIG. 3, clock signals which are input to the latch circuits 33a to 33d are not shown in FIG. 3.

Each of the adders 31a to 31d adds "1" to input data. Each of the first selectors 36a to 36c, the second selectors 37a to 37c, and the selector 38, has input terminals A and B. When the selector terminal is at a High level, the input terminal B is selected and a signal is input therein, which is in turn output. When the select terminal is at a Low level, the input terminal A is selected and a signal is input therein, which is in turn output.

The input terminal A of each of the first selectors 36a to 36c is coupled to the output of the respective adders 31a to 31c. A value "0" is input to each input terminal B. The output of each of the first selectors 36a to 36c is coupled to the input of the respective second selectors 37a to 37c of the first to third counters CT1 to CT3. The output of each of the second selectors 37a to 37c of the first to third counters CT1 to CT3 is coupled to the respective latch circuits 33a to 33c. The output of each of the latch circuits 33a to 33c is coupled to the input terminal A of the respective second selectors 37a to 37c. The output of each of the latch circuits 33a to 33c is also coupled to the respective adders 31a to 31c.

The fourth counter CT4 comprises the selector 38. The output of the selector 38 is coupled to the latch circuit 33d. The output of the latch circuit 33d is coupled to the input terminal A of the selector 38. The output of the adder 31d is coupled to the input terminal B of the selector 38. The output of the latch circuit 33d is also coupled to the adder 31d.

Each of the latch circuits 33a to 33d comprises a D-type flip-flop (DF/F), for example. The comparators 34a to 34c in the first to third counters CT1 to CT3 are coupled at one of the respective pair of input terminals to the output PRIX of the first register in the register bank section 22, the output LNIR of the second register thereof, and the output NORX of the third register thereof, respectively. The comparators 34a to 34c in the first to third counters CT1 to CT3 are coupled at the other of the respective pair of input terminals to the outputs of the latch circuit 33a of the first counter CT1, the latch circuit 33b of the second counter CT2 and the latch circuit 33c of the third counter CT3, respectively. The comparators 34a to 34c output a Low-level signal when the respective input values of the latch circuits 33a to 33c are smaller than the respective input values from the register bank section 22, and output a High-level signal when both inputs are equal to each other.

The output of the comparators 34a to 34c in the first to third counters CT1 to CT3 are coupled to the respective AND gates 35a to 35c at one of the respective pairs of input terminals thereof. The count-up signal CNTUP of the section 21 is input to the other terminal of the first AND gate 35a. The output of the first AND gate 35a is coupled to the other terminal of the second AND gate 35b band further to the selector terminal of the first selector 36a in the first counter CT1 and the selector terminal of the second selector 37b in the second counter CT2.

The output of the second AND gate 35b is coupled to the other terminal of the third AND gate 35c and further the selector terminal of the first selector 36b in the second counter CT1 and the selector terminal of the second selector 37c in the third counter CT3.

The output of the third AND gate 35c is coupled to the selector terminal of the first selector 36c in the third counter CT3 and the selector terminal of the selector 38 in the fourth counter CT4.

The operation of the thus-constructed image processing apparatus will be described below. First, the signal WAIT indicating that data on the data bus 4 is valid is input from the memory controller 2 to the DMA controller 1. Responsive to the signal WAIT, the DMA controller 1 outputs the strobe signal DMSTRB to the memory controller 2. Further, the section 21 in the DMA controller 1 outputs the count-up signal CNTUP to the counter section 23. The count-up signal CNTUP is a signal which is synchronized with a horizontal transfer clock signal, which is used to transfer the data of one pixel on the data bus 4, and thus having the same frequency as that of the horizontal transfer clock signal. Therefore, every time the image data of one pixel in a horizontal line is transferred, a High-level count-up signal CNTUP is input to the counter section 23.

The outputs C1, C2, C3 and C4 of the counters CT1 to CT4 in the counter section 23 are set to "0" at the beginning of the counting. Further, the output of each of the comparators 34a to 34c is at the Low level. Therefore, the output of each of the AND gates 35a to 35c is at the Low level. Accordingly, the first selector 36a of the first counter CT1 selects the input terminal A. The input terminal A of the first selector 36a receives a value "1" which is obtained by addition of the output C1 (initially zero) of the latch circuit 33a in the first counter CT1 with "1" by the adder 31a. The value "1" is output to the input terminal B of the second selector 37a.

Thereafter, when the section 21 outputs a High-level count-up signal CNTUP indicating a count-up command, which instructs transfer of the image data of one pixel, the second selector 37a of the first counter CT1 selects the input terminal B. Thus, the output "1" of the first selector 36a is input to the latch circuit 33a in the first counter CT1. The latch circuit 33a latches the input value "1", and outputs the value "1" as the output C1.

In this situation, when the count-up signal CNTUP is at the Low level, the second selector 37a selects and outputs the input terminal A. The second selector 37a outputs the output C1 ("1") from the latch circuit 33a as it is. Therefore, the input of the latch circuit 33a is fixed as "1" even when the count-up signal CNTUP is inverted from the High level to the Low level. When the count-up signal CNTUP is at the Low level, the output of the latch circuit 33a is latched as "1". Thus, the latch circuit 33a latches the output C1 with certainty even when the count-up signal CNTUP is at the Low level. The reliability of the latch circuit 33a is thereby improved.

The output C1 (value "1") of the latch circuit 33a in the first counter CT1 is added with "1" by the adder 31a, so that the input of the input terminal A of the first selector 36a is "2". The first selector 36a outputs the value "2" which is in turn output to the input terminal B of the second selector 37a. Thereafter, when the count-up signal CNTUP is at the High level, the second selector 37a selects the input terminal B ("2"), and output the value "2" to the latch circuit 33a. The latch circuit 33a outputs this value "2" as the output of the first counter CT1 to the address calculating section 24.

It should be noted that the latch circuit 33a takes the output of the input terminal B of the second selector 37a in synchronization with a clock signal (not shown) with a timing such that the output of the second selector 37a is stable and latches it.

The address calculating section 24 is provided with the transfer initiation address BASE which has been stored in the fourth register of the register bank section 22. Based on the transfer initiation address BASE and the output C1 of the first counter CT1, the address of the image data of a pixel to be transferred is sequentially generated. The generated address ADR is output to the memory controller 2 which in turn reads the image data of the predetermined pixel from the external memory 5 based on the address ADR.

Thereafter, when the count-up signal CNTUP is again at the High level in order to read the image data of a pixel which is to the immediate right of the pixel whose image data has been transferred, the second selector 37a in the first counter CT1 selects the input terminal B. Therefore, the output "2" of the first selector 36a is input to the latch circuit 33a, and the latch circuit 33a outputs the value "2" as the output C1 of the first counter CT1 and latches the output state.

Thereafter, similar operations are repeated. Specifically, every time image data transfer processing is conducted for each pixel in the horizontal direction, the count-up signal CNTUP is at the High level, and the output C1 of the first counter CT1 is incremented by one.

The AND gate 35a in the second counter CT2 also receives the count-up signal CNTUP. Therefore, when the count-up signal CNTUP is at the High level, the output of the AND gate 35a in the second counter CT2 is at the High level. The output of the AND gate 35a is input to the first selector 36a in the first counter CT1 which selects and outputs the input terminal B ("0"). The second selector 37a in the first counter CT1 also selects and outputs the value of the input terminal B (i.e., the output of the first selector 36a), since the count-up signal CNTUP is at the High level. Thus, the latch circuit 33a receives the value "0". Therefore, the output of latch circuit 33 which is the output of the counter CT1 is "0". The output of comparator (CMP) 34a in the second counter CT2 is at the Low level, and the output of the AND gate 35a in the second counter CT2 returns to the Low level.

In the second counter CT2, when the output of the AND gate 35a is at the High level, the output C2 of the latch circuit 33b added with "1" is output as the output C2 by an operation similar to that of the above-described first counter CT1. When the output of the comparator 34a is at the high level, i.e., a value corresponding to the number of pixels output from the first counter CT1 is equal to the number of pixels in the horizontal direction in a unit block, i.e., PXIR, the AND gate 35a is at the High level in synchronization with the count-up signal CNTUP which is at the High level. The latch circuit 33b is reset in synchronization with this High-level signal. Therefore, the output of the latch circuit 33b which is the output C2 of the second counter CT2 is reset every time the number of pixels in the horizontal direction in a unit block counted by the second counter CT2 reaches the predetermined pixel number PXIR.

In the third counter CT3, when the output of the AND gate 35b is at the High level, the output C3 of the latch circuit 33c added with "1" is output as the output C3 by an operation similar to that of the above-described first counter CT1.

When the output of the comparator 34b is at the High level, i.e., the number of pixels in the vertical direction in a unit block output from the second counter CT2 is equal to the number of pixels LNIR in the vertical direction in a unit block, the AND gate 35b is at the High level in synchronization with the count-up signal CNTUP which is at the High-level signal. Thereafter, the latch circuit 33b is reset in synchronization with the High-level signal. Therefore, the output of the latch circuit 33c which is the output C3 of the third counter CT3 is reset every time the number of times the number of pixels counted in the vertical direction in a unit block reaches the number of pixels in the vertical length of the unit block, i.e., the number of unit blocks, reaches the predetermined pixel number of pixels LNIR.

In the fourth counter CT4, when the output of the AND gate 35c is at the High level, the output C4 of the latch circuit 33d added with "1" by the selector 38 is output as the output C4. When the output of the comparator 34c is at the High level, i.e., the counted number of unit blocks output from the third counter CT2 is equal to the number of overall blocks in a region to be subjected to data processing, the AND gate 35c is at the High level in synchronization with the count-up signal CNTUP which is at the High level. Thereafter, the latch circuit 37c is reset in synchronization with this High-level signal. Therefore, the output of the latch circuit 33d which is the output C4 of the fourth counter CT4 is the counted number of unit blocks.

The address calculating section 24 performs address calculation based on the output values C1 to C4 of the counters CT1 to CT4 in the counter section 23, the address increment value (INCPX) representing an address space of the external memory 5 between the address of a pixel and the address of another pixel immediately below that pixel, which is stored in the sixth register in the register bank section 22, and the transfer initiation address (BASE) stored in the fourth register in the register bank section 22. The address calculating section 24 calculates the real address ADR in the external memory 5 in accordance with the following expression:

$$ADR=BASE+(C3\times(PXIR+1)+C1)+(C4\times(LNIR+1)+C2)\times INCPX$$

and the calculated address ADR is input to the memory controller 2.

The real address ADR calculated in the address calculating section 24 is also input to the end address detecting section 25. The end address detecting section 25 has been provided with the transfer end address (END) which is stored in the fifth register of the register bank section 22. When the end address detecting section 25 detects that the calculated real address ADR is equal to the transfer end address (END), the DMA transfer is ended. It should be noted that the counter section 23 shown in FIG. 3 is reset when the real address ADR is equal to the transfer end address (END).

Therefore, in the region to be subjected to data processing shown in FIG. 4, transfer of image data is initiated from an upper left block 0 corresponding to the transfer initiation address (BASE). In this case, the image data is sequentially transferred from the upper left block 0 toward the right in the horizontal direction.

When the image data of all pixels on the uppermost line including block 0 along the horizontal direction have been transferred, transfer of image data of all pixels in a horizontal line immediately below the uppermost line is initiated from the leftmost pixel thereof. When the image data of all pixels in block 0 have been transferred, block 1 which is to the immediately right of block 0 in the horizontal direction is subjected to transfer of the image data of all pixels therein.

In the region to be subjected to data processing shown in FIG. 4, when a transfer of image data is completed for all blocks in one horizontal line, all blocks in a horizontal line immediately below the previous line are sequentially subjected to transfer of image data in a similar manner.

As described above, according to the image processing apparatus of the embodiment of the present invention, once the number of pixels in the horizontal direction (i.e., the horizontal size of a unit block to be transferred to the DMA controller 1), the number of pixels in the vertical direction (i.e., the vertical size of the unit block), the number of blocks in the horizontal direction in a region on a screen to be subjected to data processing, the transfer initiation address, the transfer end address, the address increment representing an address space of the memory between the address of a pixel and the address of another pixel immediately below that pixel, are set (i.e., one-time DMA actuation), all image data can be transferred on a block-by-block basis from the start address to the end address. Further, since data is transferred on a block-by-block basis, the buffer capacity of the image processing module 3 at the input and output sides thereof can be made a small size sufficient for the size of a block unit.

EXAMPLE 2

Figure 5:
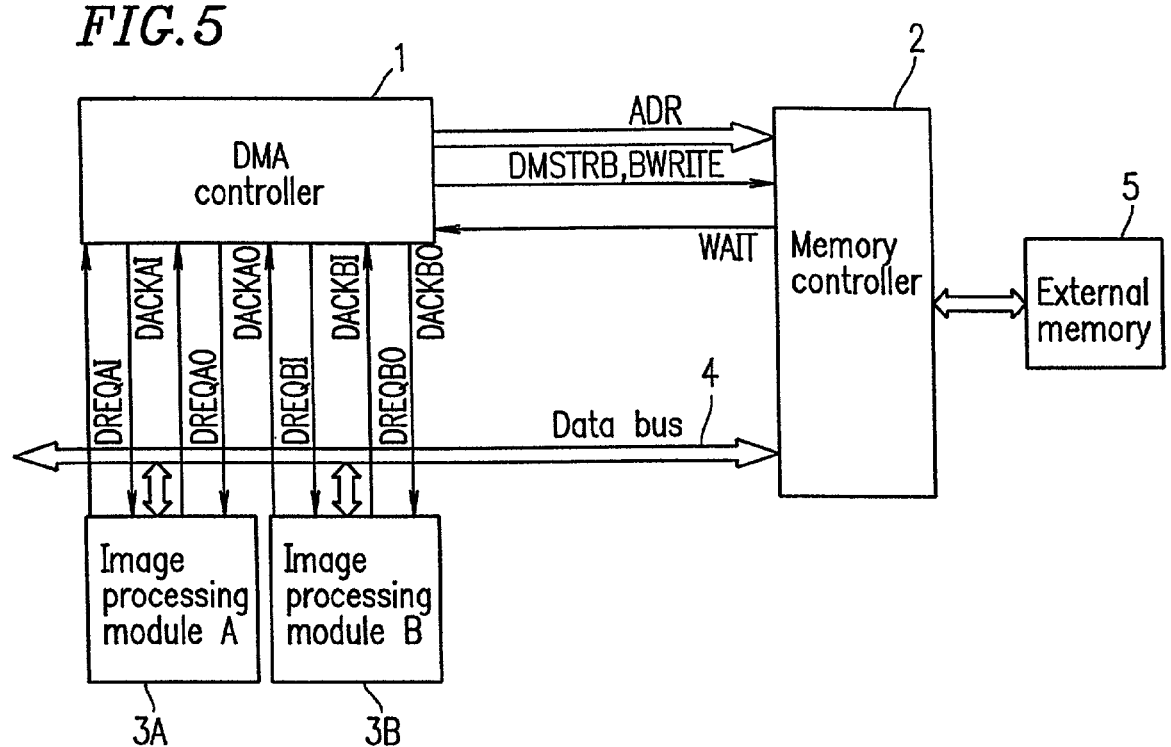
FIG. 5 is a block diagram showing a configuration of an image processing apparatus according to Example 2 of the present invention.

FIG. 5 is a diagram for explaining an image processing apparatus according to Example 2 of the present invention. In Example 2, two image processing modules share a data bus.

In Example 2, the DMA controller 1 is assigned separate DMA channels so as to control input and output of data to and from image processing modules 3A and 3B. In FIG. 5, signals input from the image processing module 3A are designated by their signal names with a suffix AI, and signals output therefrom are designated by their names with a suffix AO. Further, signals input from the image processing module 3B are designated by a suffix BI and signals output therefrom are designated by their names with a suffix BO. Channels are distinguished from one another by designating the names with suffixes, AI, AO, BI, and BO including the names A and B of the modules and the I and O of the terms input and output of the modules.

Figure 6:
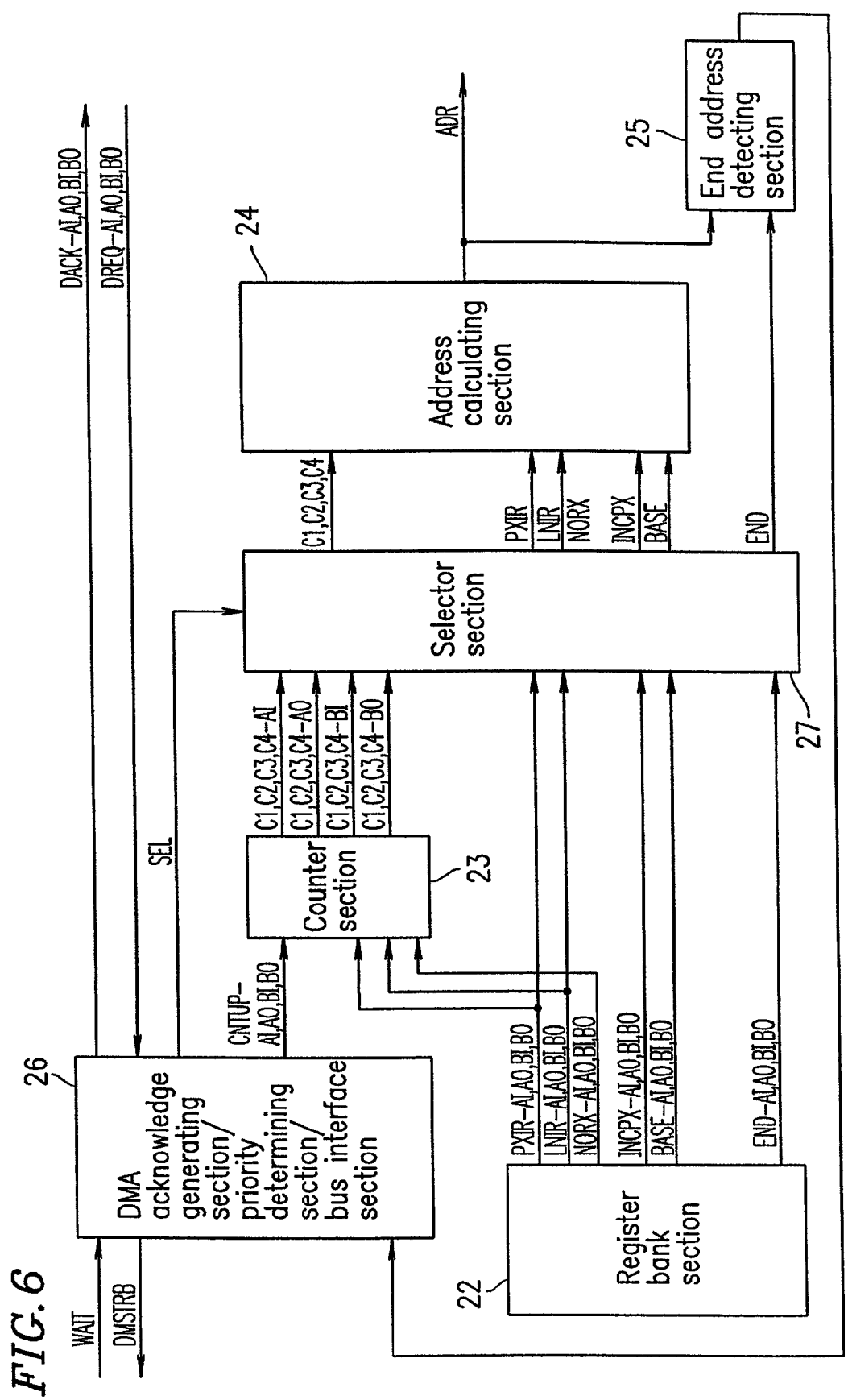
FIG. 6 is a block diagram for explaining a configuration of a DMA controller in the image processing apparatus of Example 2.

FIG. 6 is a diagram for explaining a configuration of a DMA controller of Example 2. The DMA controller is provided with a section 26 including a DMA acknowledge generating section, a priority determining section, and a bus interface section. This section 26 is the section 21 added with a priority determining section which determines the priority of the image processing modules 3A and 3B, i.e., from which of them data is input or output through a data bus 4.

Further, a counter section 23 is provided with counters, the number of which corresponds to the number of channels. A register bank section 24 is provided with setting registers, the number of which corresponds to the number of channels. The DMA controller 1 further includes a selector section 27 for selecting a register and a counter for selecting a channel being selected. The outputs of the register and counter selected by the selector section 27 are input to an address calculating section 24.

The section 26 determines the priority of image processing modules to which a DMA acknowledge signal DACK is sent responsive to DMA requests (DREQ-AI, AO, BI, BO) from the image processing module 3A and 3B. A signal SEL indicating a channel being transferred is output to the selector section 27 in accordance with the priority.

Signals either from the register bank section 22 or the counter section 23 corresponding to the image processing modules 3A or 3B are selected by the selector section 27 in accordance with the signal SEL based on the above-described priority. The selected signals are output to the address calculating section 24. In the address calculating section 24 shared by all of the channels, a real address ADR in an external memory 5 is calculated and sent to the memory controller 2.

In Example 1, since there is only one image processing module, only the signal WAIT is used to distinguish a data read operation from the external memory from data storing (write) operation to the external memory. In Example 2, since there are two image processing modules 3A and 3B, a read/write signal BWRITE is enerated based on the signal SEL, and the signal WAIT and the BWRITE signal are used to inform the memory controller 2 of which of the image processing modules 3A and 3B is used for data read or data write. Therefore, even if a plurality of image processing modules share a data bus 4, processing can be carried out in a manner similar to that of Example 1.

EXAMPLE 3

In Example 3, a case where the same data needs to be repeatedly transferred will be described.

For example, local image data processing carried out in an image processing module may be smoothing in which the output data of a pixel is calculated by referencing a plurality of neighboring pixels. In this case, when data is transferred on a block-by-block basis, the pixel data of a peripheral portion of a block to be transferred needs to be repeatedly transferred in order to match and superpose the block with its adjacent block(s).

To address such a situation, in Example 3, in addition to the elements in Examples 1 and 2, the register bank section 22 of the DMA controller 1 comprises an additional register which stores the number of pixels YINC in a vertical line from the uppermost line of a block to the uppermost line of another block immediately below that block from which data transfer is initiated again after the image data of all of the blocks in one horizontal stage has been transferred. In this case, the two adjacent blocks may overlap. The output of the additional register is input to a counter section 23'.

Figure 7:
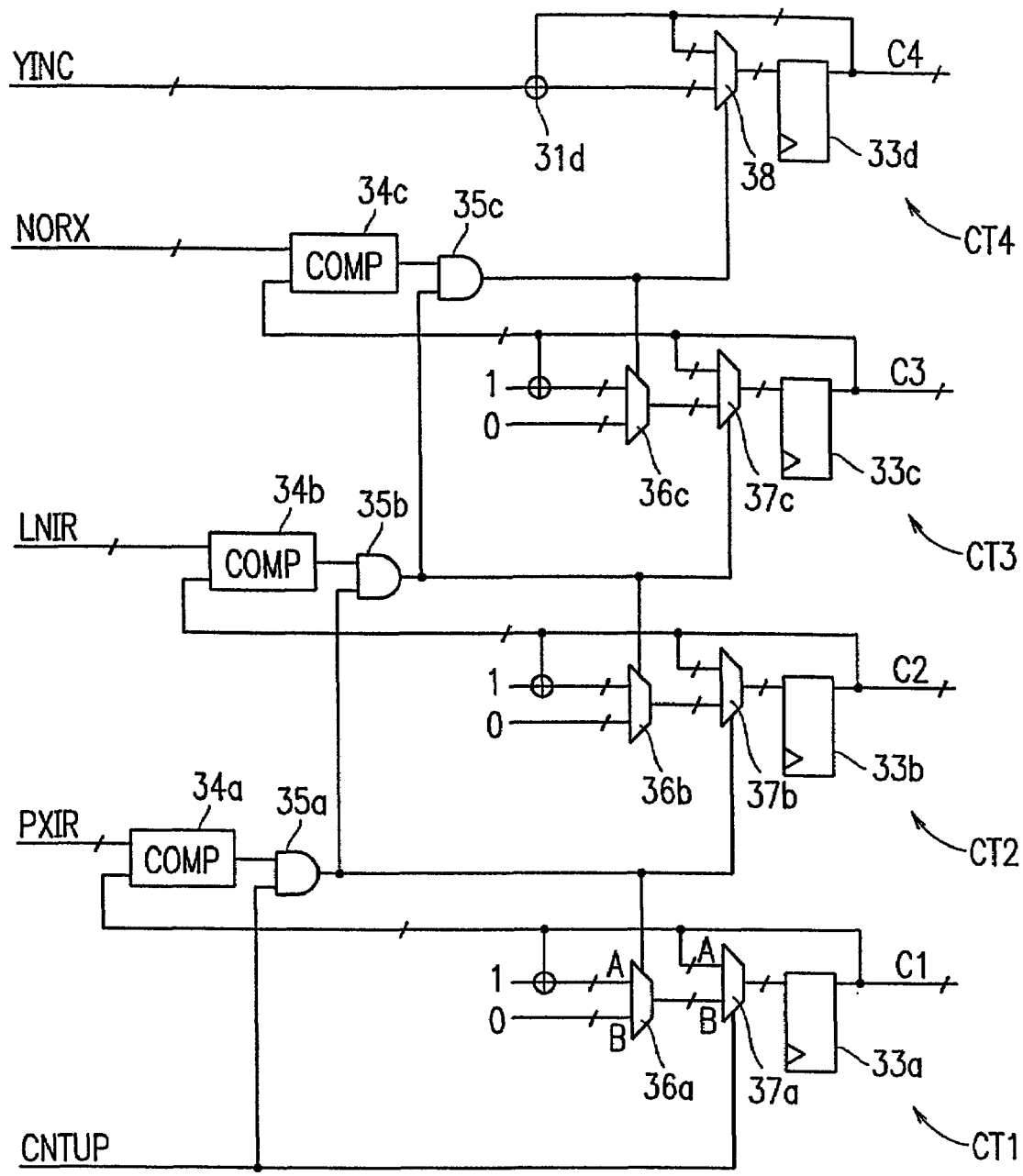
FIG. 7 is a circuit diagram for explaining a configuration of a counter section of the DMA controller in the image processing apparatus of Example 3.

The configuration of the counter section 23' is shown in FIG. 7. This counter section 23' differs from the counter section 23 shown in FIG. 3 only in the structure of the fourth counter CT4. In the fourth counter CT4, the output YINC of the register additionally provided in the register bank section 22 is input to the adder 31d, and an adder 31d adds the output YINC to the output C4 of a latch circuit 33d and outputs the result to the input terminal B of a selector 38. The remaining configuration is the same as that of the counter section 23 in FIG. 3.

In the thus-constructed counter section 23', in a cycle after the output C1 of the first counter CT1 is equal to the horizontal size of one block (i.e., the number of pixels PXIR in the horizontal direction); the output C2 of the second counter CT2 is equal to the vertical size of one block (i.e., the number of pixels LNIR in the vertical direction); and the output C3 of the third counter CT3 is equal to the number of blocks NORX in the horizontal direction, and the number of pixels YINC in the vertical direction up to the data transfer initiation position of a block on a subsequent stage is added to the output value C4 of the fourth counter CT4. Therefore, the fourth counter CT4 counts the number of pixels in the vertical direction but not the number of blocks in the vertical direction.

In this case, when the number of pixels YINC in the vertical direction is equal to the vertical size (the number of pixels) of one block LNIR+1 (YINC=LNIR+1), the same transfer processing as that of Examples 1 and 2 is conducted. When data transfer processing has been done for all blocks arranged in the horizontal direction, blocks immediately below the previous blocks are subjected to data transfer processing.

Figure 8:
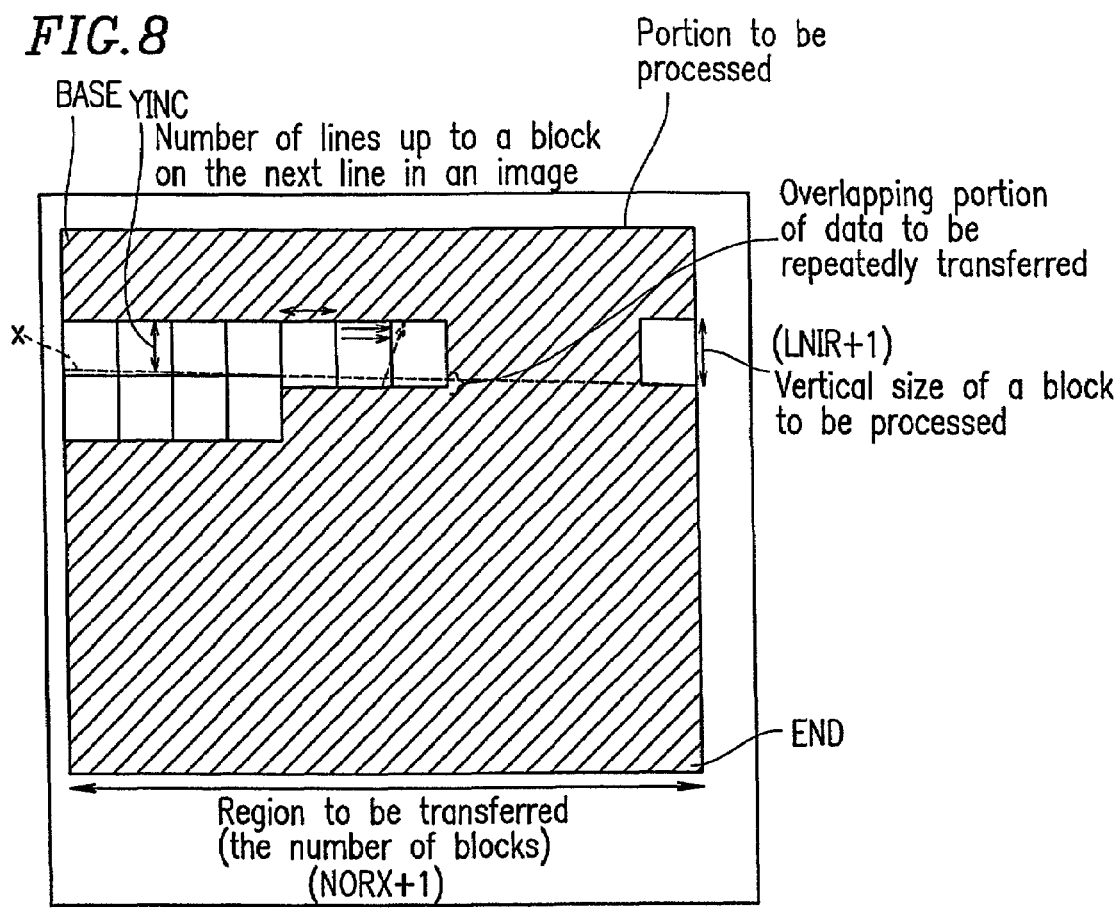
FIG. 8 is a diagram for explaining the flow of data transfer in the image processing apparatus of Example 3.

When YINC is smaller than the vertical size (the number of pixels) of one block LNIR (YINC<LNIR+1), the data of (LNIR−YINC+1) pixels in the vertical direction are repeatedly transferred as shown in FIG. 8. In FIG. 8, dashed line x indicates the direction in which data processing continues after the data transfer processing of one stage of blocks in the horizontal direction is ended and data processing of a block on the subsequent stage is initiated.

When the number of pixels in the vertical direction for which data is repeatedly transferred may be fixed, the register which stores the value YINC may not be provided in the register bank section 22. In this case, YINC may be calculated in the register bank section 22 by:

$LNIR+1-$(the number of pixels in the vertical direction whose data is repeatedly transferred)$=YINC$ In Example 3, the address calculating section 24 calculates a real address ADR in the external memory 5 by:

$ADR=BASE+(C3\times(PXIR+1)+C1)+(C2+C4)\times INCPX.$

When data in a horizontally adjacent block is repeatedly transferred, since a buffer in an image processing module holds the data of the block which has been subjected to data transfer processing, an increase in the number of data values to be transferred can be prevented by utilizing the held data.

EXAMPLE 4

In Example 4, a case where the size of a block stored in the DMA controller 1 needs to be changed will be described below.

For example, when local image signal processing carried out in the image processing module 3 is scaling in which the scaling factor can be arbitrarily changed, since the amount of data is changed by modifying the scaling factor, the size of a block stored in the DMA controller 1 needs to be changed.

Figure 9:
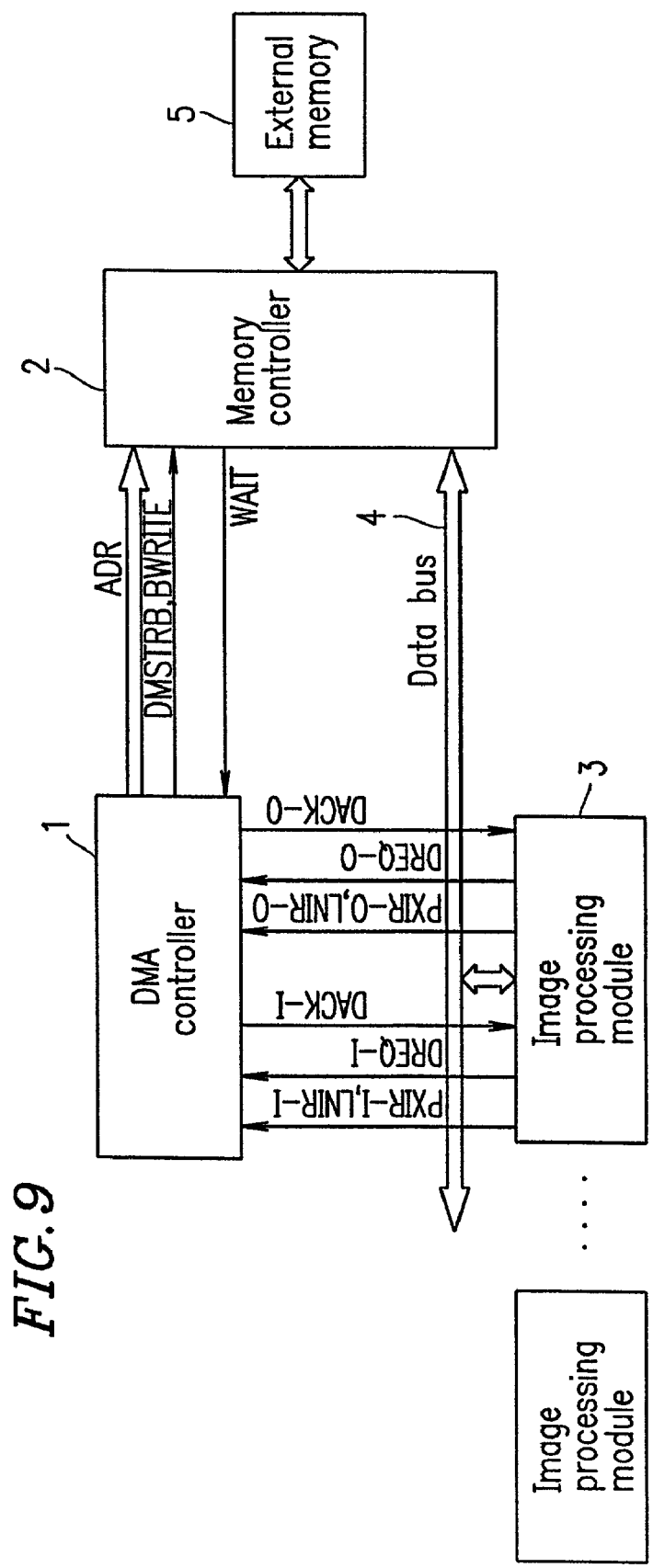
FIG. 9 is a block diagram for explaining a configuration of an image processing apparatus according to Example 4 of the present invention.
Figure 10:
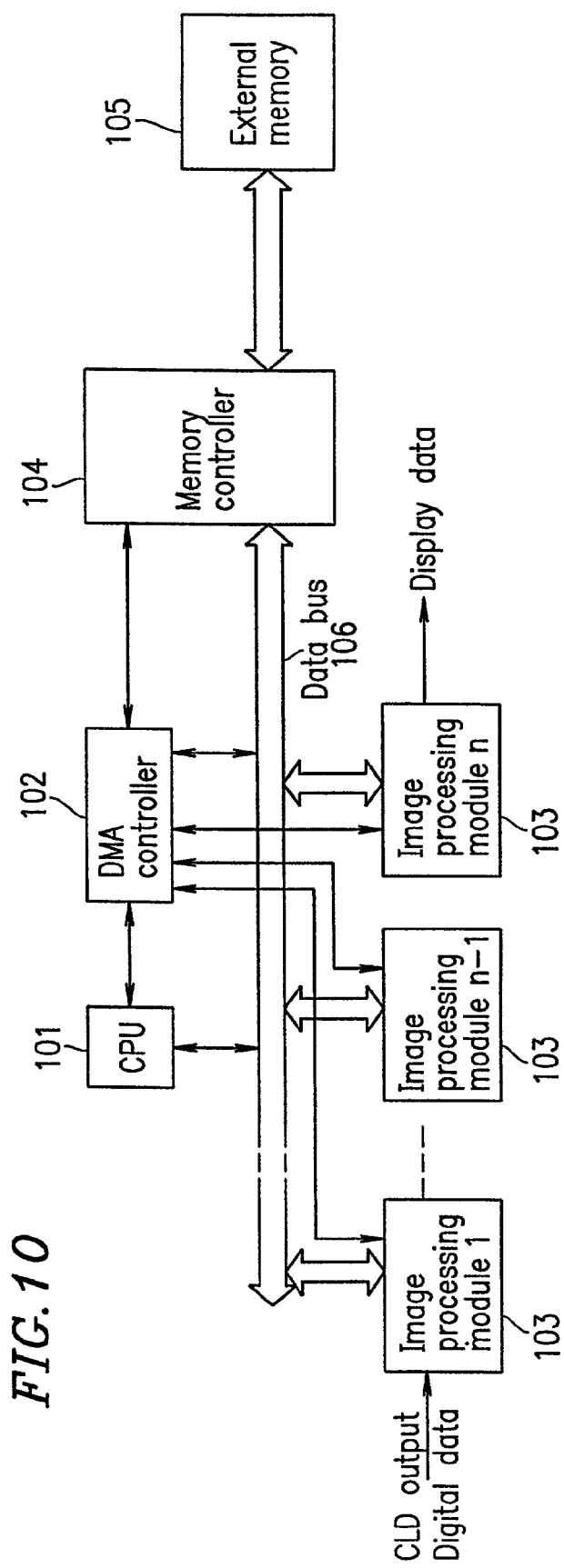
FIG. 10 is a block diagram for explaining the configuration of a typical image processing apparatus.
Figure 11:
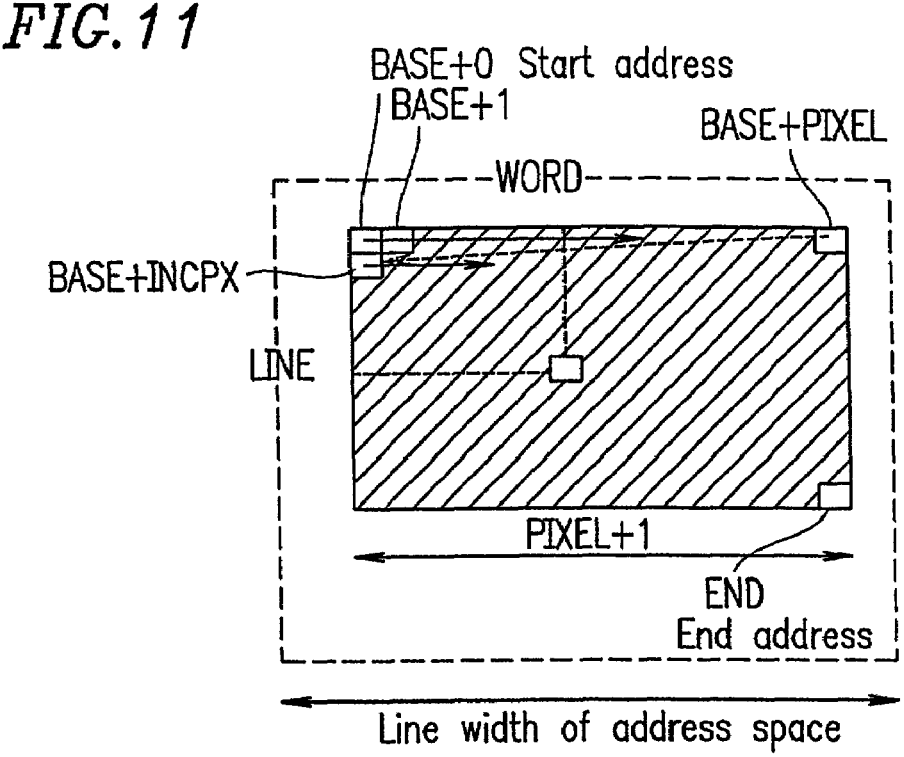
FIG. 11 is a diagram for explaining the position of a pixel in an image whose image data is to be transferred, and the address space of a memory storing the data of the pixel.
Figure 12:
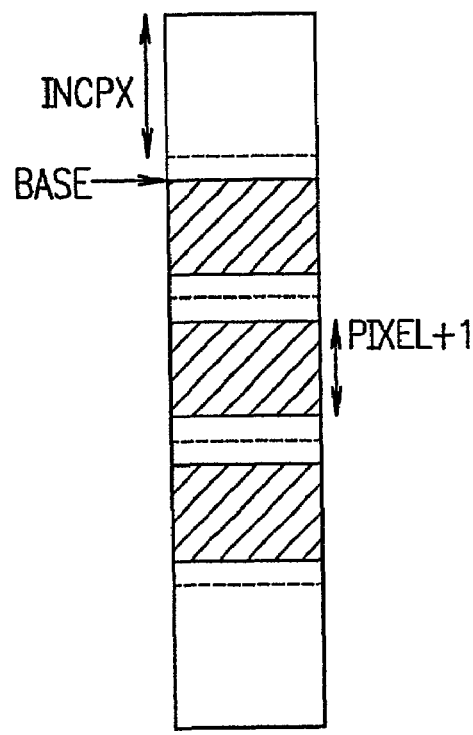
FIG. 12 is a diagram for explaining a region in a memory from which data is transferred.
Figure 13:
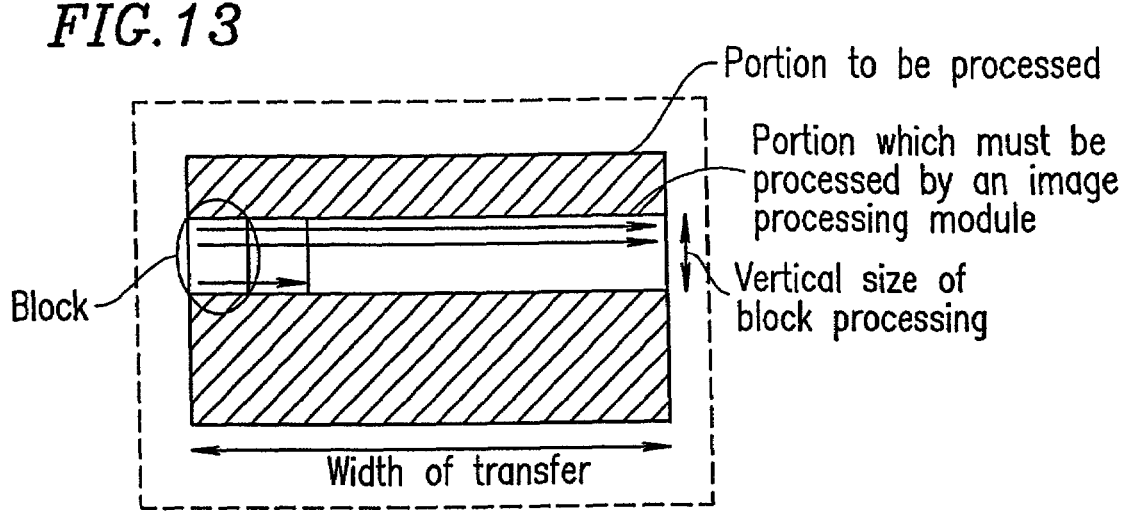
FIG. 13 is a diagram for explaining the size of a buffer required for transferring data on a block-by-block basis to an image processing module in a conventional manner.

To address such a situation, in Example 4, the values PXIR, LNIR, YINC, etc. stored in register bank section 22 as described in Examples 1 to 3 is stored in the image processing module 3. For example, as shown in FIG. 9, values PXIR-I, LNIR-I, YINC-I, etc. to be input to an image processing module 3 is sent from another image processing module 3. After scaling of image data, values PXIR-O, LNIR-O, YINC-O, etc. corresponding to the scaling result are sent from the other image processing module 3. Therefore, the value of a register in the DMA controller 1 can be set for each corresponding image processing module, thereby obtaining fine control. Control or the setting of register values can be made easier as compared to when the image processing apparatus is externally controlled by a host computer.

As described above, according to the present invention, filtering (e.g., noise reduction), scaling (e.g., interpolation), etc. is performed by local image processing using the data of surrounding pixels associated with a pixel of interest. Therefore, in an image processing apparatus in which data can be read from or written to a memory on a block-by-block basis, data corresponding to an image region to be processed can be transferred in one-time DMA actuation by a simple control circuit and simple settings, thereby obtaining high-speed processing.

The buffer capacity of an image processing module at the input and output sides thereof can be made a small size which is suitable for the size of a block unit, thereby making it possible to reduce the chip size and the manufacturing cost.

This is because the signal processing portion of the image processing module performs signal processing on a block-by-block basis, and if the data of a unit block is stored in a buffer in the input side, the signal processing can be performed using the data. In a practical situation, considering data holding, etc., the data capacity of each of the buffers on the input and output sides may be the amount of about two unit blocks.

Further, even when an image processing apparatus comprises a plurality of image processing modules, and the input and output of each image processing module have various block sizes, block transfer can be carried out at any size, resulting in easier control.

Still further, if an adjacent pixel is referenced in image processing, input data of a range wider than that of output data is required, a peripheral portion of a block needs to be repeatedly transferred as input data, then an overlapped portion in the vertical direction of a block can be automatically transferred. In this case, the overlap in the horizontal direction can be stored in a buffer in an image processing module, thereby making it possible to speed up processing by simple control.

Furthermore, when image processing is scaling (enlargement or reduction) in which the scaling factor can be changed, and the size of an input or output block is changed, the scaling factor is stored in an image processing module and the image processing module can be used to automatically set the size of a block to be transferred by a DMA controller, there by making it possible to make control easier. For example, when an image is enlarged, the value of a register is set to be equal to the size of a buffer on the output side of an image processing module. When an image is reduced, the value of a register is set to be equal to the size of a buffer on the input side of the image processing module. Therefore, the buffers are effectively used, thereby making it possible to improve the efficiency of transfer.

The present invention exhibits a particularly large effect when the present invention is applied to portable imaging apparatuses, such as portable digital still cameras and digital video cameras, which use a charge coupled device for which miniaturization and a reduction in weight are demanded.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An apparatus for processing an image, wherein the image includes a plurality of unit blocks each containing M×N pixels where M pixels are arranged in a horizontal direction and N pixels are arranged in a vertical direction, the apparatus comprising:
a memory for storing the image data of each pixel in the plurality of unit blocks;
a direct memory access controller for reading the image data from the memory by accessing the memory on a block-by-block basis by generating the addresses of the pixels in each unit block; and
a plurality of image processing modules for receiving the image data of each unit block read based on the addresses generated by the direct memory access controller and sequentially transferred via a data bus, processing the image data of the unit block, and outputting the processed image data of the unit block,
wherein the direct memory access controller sequentially generates the addresses of the pixels in one horizontal line in each unit block and thereafter generates the addresses of the pixels on another horizontal line immediately below said one horizontal line in the unit block, and repeats this operation to read the image data of the unit block, and
the direct memory access controller sequentially reads the image data of the unit blocks in one horizontal line in the image and thereafter sequentially reads the image data of the unit blocks on another horizontal line immediately below said one horizontal line in the image, and repeats this operation to read the data of the image.

2. An apparatus according to claim 1, wherein the direct memory access controller comprises:
a plurality of registers for storing the number of pixels in one horizontal line in one unit block, the number of pixels in one vertical line in one unit block, the number of blocks in one horizontal line in the image, an address increment representing an address space of the memory between the address of one pixel and the address of another pixel immediately below said one pixel, a data transfer initiation address, and a data transfer completion address, respectively;
a plurality of counters for determining the horizontal and vertical coordinates of the pixels in each unit block, the ordinal number in the horizontal direction of the unit block, and the ordinal number in the vertical direction of the unit block, respectively, wherein the pixels correspond to the input/output data of the memory; and
an address calculating section for calculating each address based on the values stored in the plurality of registers and values counted by the plurality of counters.

3. An apparatus according to claim 2, wherein the number of pixels in one horizontal line in one unit block being input to or output from the image processing module and the number of pixels in one vertical line in said unit, both numbers being obtained from the plurality of image processing modules, are stored in the respective registers of the direct memory access controller.

4. An apparatus according to claim 1, wherein the image processing module comprises at least:
an input buffer;
an output buffer;
a direct memory access request outputting section for outputting a direct memory access request for data input to the direct memory access controller when the data of one unit block stored in the input buffer remains small, and outputting a direct memory access request for data output to the direct memory access controller when a predetermined amount of the data of one unit block is stored in the output buffer.

5. An apparatus according to claim 1, wherein the direct memory access controller further comprises a register for storing the number of pixels on a vertical line from the uppermost line of one unit block to the uppermost line of another block immediately below said one block, wherein from the uppermost line of said another block, data transfer is initiated again after the image data of all of the unit blocks in one horizontal line in the image has been transferred.

6. A portable imaging apparatus comprising an image capturing section including a charge coupled device and an image processing apparatus according to claim 1, wherein the image processing apparatus processes the data of an image captured by the charge coupled device.

7. A method for processing an image using an apparatus for processing an image, wherein the image includes a plurality of unit blocks each containing M×N pixels where M pixels are arranged in a horizontal direction and N pixels are arranged in a vertical direction, the method comprising:
   storing in a memory the image data of each pixel in the plurality of unit blocks;
   reading the image data from the memory by accessing the memory on a block-by-block basis by generating the addresses of the pixels in each unit block by a direct memory access controller; and
   receiving the image data of each unit block read based on the addresses generated by the direct memory access controller and sequentially transferred via a data bus, processing the image data of the unit block, and outputting the processed image data of the unit block,
wherein the direct memory access controller sequentially generates the addresses of the pixels in one horizontal line in each unit block and thereafter generates the addresses of the pixels on another horizontal line immediately below said one horizontal line in the unit block, and repeats this operation to read the image data of the unit block, and
the direct memory access controller sequentially reads the image data of the unit blocks in one horizontal line in the image and thereafter sequentially reads the image data of the unit blocks on another horizontal line immediately below said one horizontal line in the image, and repeats this operation to read the data of the image.

\* \* \* \* \*